May 31, 1949.  H. F. CLARK  2,472,002
AUTOMATIC SCREW AND NUT RELEASE
Filed May 15, 1946  2 Sheets-Sheet 2
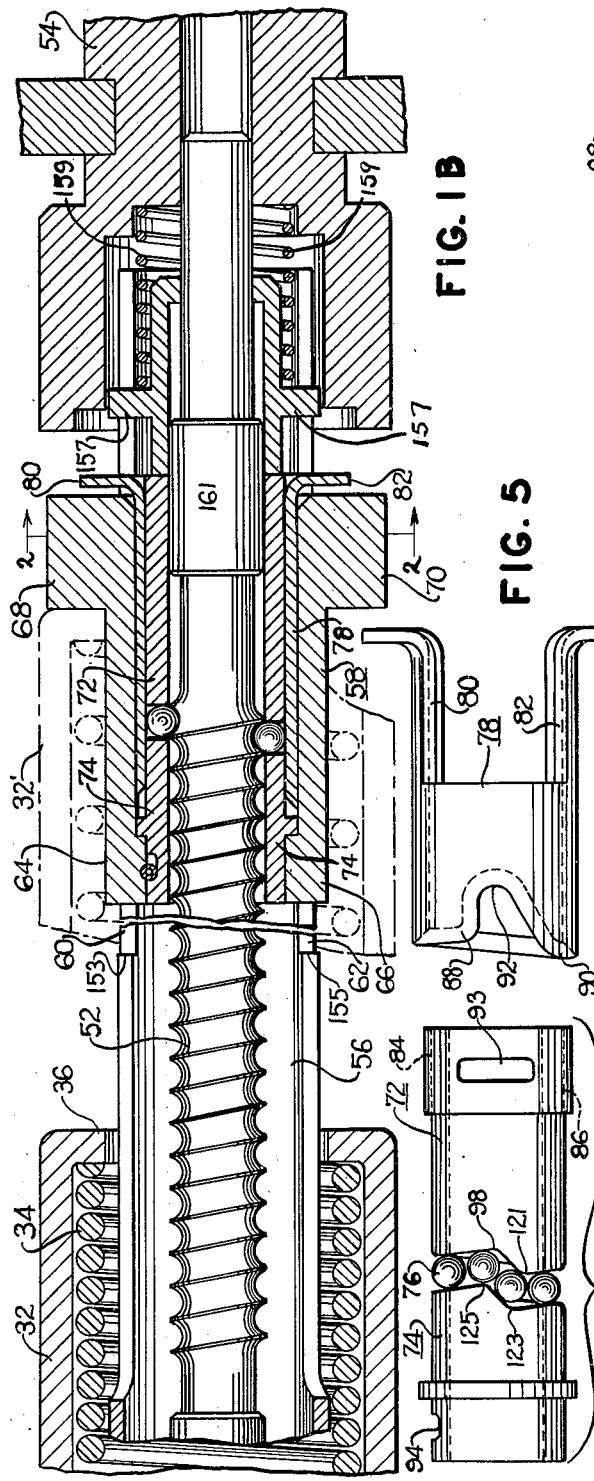
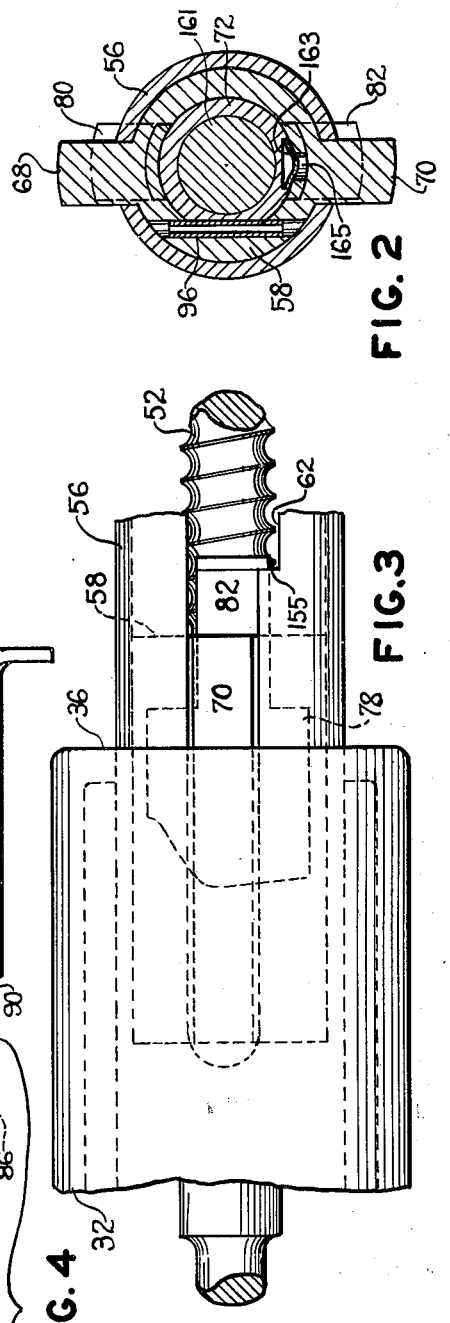
INVENTOR.
Harry F. Clark
BY
Spencer Hardman and Fehr
attorneys Patented May 31, 1949

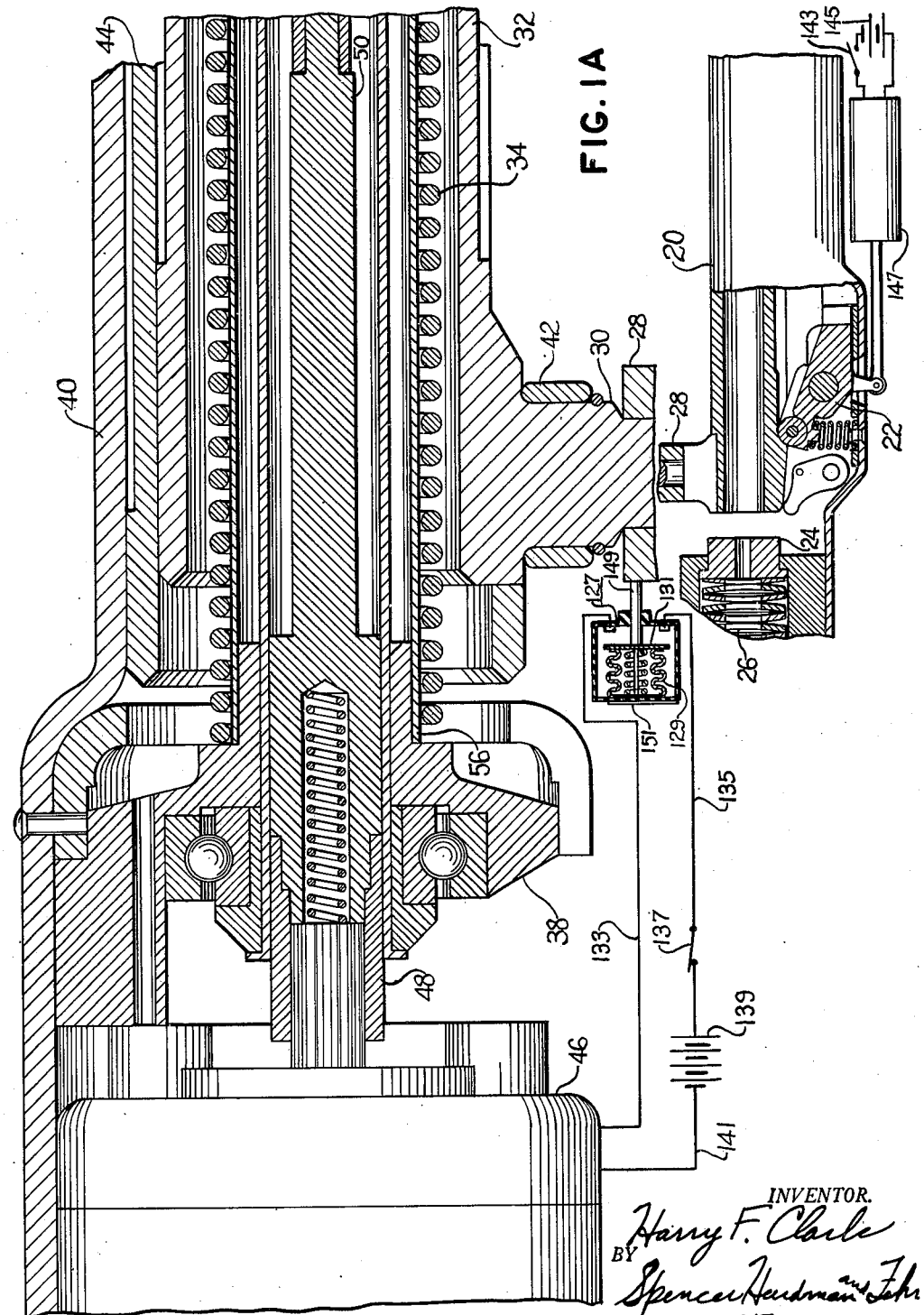
FIG. IA

2,472,002

UNITED STATES PATENT OFFICE 2,472,002

AUTOMATIC SCREW AND NUT RELEASE

Harry F. Clark, Oakwood, Ohio, assignor to General Motors Corporation, Dayton, Ohio, a corporation of Delaware Application May 15, 1946, Serial No. 669,822

16 Claims. (Cl. 74—2)

This invention relates to a screw and self-releasing ball bearing nut arrangement which may form a part of electrical and other apparatus.

There are many applications in which it is desirable to move a device in one direction against a force and then allow it to move in the opposite direction under the influence of that or another force. One of such applications is an aircraft machine gun which needs to be cocked against the tension of a spring in the event of a failure to fire. This cocking could be done by a nut and a screw driven by a reversing electric motor. However, reversing electric motors are heavy and more expensive than single direction motors and require a more complicated and expensive form of control. Moreover, the time required to reverse the motor and return the nut is substantially as great as to move the nut in the opposite direction against the force. The friction in an ordinary screw and nut combination is very high, so that the load upon the motor is much higher than that necessary merely to overcome the force.

It is an object of my invention to provide a nut and screw combination having low friction wherein the nut can be released from the screw.

It is another object of my invention to provide a ball bearing type nut and screw combination with an automatic releasing means.

It is another object of my invention to provide a ball bearing type nut and screw combination with an automatic release which will be released at one end of a traverse and be re-engaged at the opposite ends thereof.

As an example I have shown an electrical machine gun charging or cocking device which automatically cocks the gun in the event a cartridge fails to fire. To do this in the most economical manner, I have provided a single direction electric motor which drives a long screw provided with a ball bearing nut. A time delay switch, normally kept open by the normal operation of the gun, is provided for closing the circuit to the electric motor when the machine gun stops firing with the bolt in its forward position. This causes the motor to turn the screw to cause the nut to move rearwardly along the screw and carry the bolt to its rearward position where it may be latched by the sear. As the nut moves from its forward to its rearward position it compresses a spring which is used to propel the bolt to the firing position. The nut is automatically released from the screw by removing a portion of the ball race so that when the bolt is released the nut will be returned to its forward position along with the bolt under the force of the spring without further operation of the motor.

Further objects and advantages of the present invention will be apparent from the following description, reference being had to the accompanying drawings, wherein a preferred form of the present invention is clearly shown.

In the drawings:

Fig. 1—A is the rearward horizontal section, and Fig. 1—B is the forward horizontal section of a machine gun charging or cocking device, together with a portion of the bolt mechanism;

Fig. 2 is a sectional view taken along the line 2—2 of Fig. 1—B;

Fig. 3 is a top fragmentary view of the charger showing the ball bearing nut in its rearward position;

Fig. 4 is a view showing the balls in the ball race and the two elements forming opposite sides of the ball race; and Fig. 5 is a view of the cam member forming the periphery of the ball race.

Referring now to the drawings and more particularly to Fig. 1—A, there is shown the bolt 20 of an aircraft machine gun being held in its rearward position by the sear mechanism generally designated as 22. A buffer plate 24 backed by a plurality of buffer springs 26 is provided for absorbing the force of the recoil beyond the position shown. This portion of the gun is shown on a reduced scale as compared with the portion of the machine gun charger proper shown in the upper portion of the figure. The bolt 20 is connected through the interconnecting projections at 28 and 30 with the bushing 32. This bushing 32 surrounds the compression coil spring 34 which provides the force for forcing the bolt 20 into the firing position. As shown in Fig. 1—B, the bushing 32 has an inturned flange 36 supporting one end of the coil spring 34 while the opposite end is supported by the bearing support 38 fixed to the housing 40 of the gun. The projection 30 is provided with a roller 42 which engages the helical slot in the rotatable cylinder 44 provided with a gear meshing with a rack to operate the cartridge fitting mechanism.

The housing 40 supports a single direction electric motor 46 which, through the coupling 48 and the shaft extension 50, drives the ball bearing type screw 52. The other end of the ball bearing type screw 52 is mounted in a bearing 54 supported by the housing of the gun. The screw 52 is surrounded by a sleeve 56 provided with long straight slots 60 and 62 on its opposite sides.

Shown at the forward end of its traverse is my releasable ball bearing nut which includes the housing 58 having key projections 64 and 66 on the opposite sides thereof which fit against the top edge of each of the slots 60 and 62 in the sleeve 56 and which have their outer surfaces flush with the outer surface of the sleeve 56. The housing 58 is also provided with square projections 68 and 70 which extend outwardly from the key projections 64 and 66.

Locked securely within the ball housing 58 are the front and rear ball guides 72 and 74 between which are held a sufficient number of steel balls 76 to fill the ball race provided in between these guides. A ball cam 78 has its cylindrical portion fitting over the reduced cylindrical portion of the front ball guide 72 and has longitudinal projections 80 and 82 which extend longitudinally in slots 84 and 86 in the enlarged front end of the front ball guide. These projections 80 and 82 have outwardly turned end portions or prongs which extend in front of the projections 68 and 70, but are wider, as shown in Figs. 2 and 3.

The ball cam 78 is axially movable and has an inwardly beveled cam edge which has its major portion in the form of a helix beginning at the point designated by the reference character 88 and terminating at the point designated by the reference character 90. This beveled face in the form of a helix is identical to the helix of the screw 52. Between the points 88 and 90 there is provided a recess 92 likewise inwardly beveled. Through the interfitting of the projections 80 and 82 with the slots 84 and 86 in the front ball guide 72, the ball cam 78 is always kept orientated with respect to the front ball guide 72 and the rear ball guide 74 are kept in orientation by the pin slots 93 and 94 by which they are pinned to the housing by pins, such as the pin 96 shown in Fig. 2.

The front ball guide 72 has the major portion of its rearward edge in the form of a helix beginning at the point 98 and ending at the point 121. Likewise the forward edge of the rear ball guide is in the form of a helix beginning at the point 123 and ending at the point 125. These helical surfaces are identical to the helices of the screw 52. Between the ends of these helices is a return path which allows the balls to return from the end of the helix to the beginning of the helix of this race provided between the front and rear ball guides. The recess 92 registers with this return path when the ball cam is in the position shown in Fig. 1-B.

When the ball cam 78 is moved to cover the ball race, the inwardly beveled surfaces upon the helical end of this cam 78 will cam the balls 76 in the helical portion of the ball race into the ball grooves of the screw 52. By reason of the recess 92 the balls as they leave the end of the helical portions of the ball race can freely pass over one of the threads to the beginning of the helical section of the ball race. When the ball cam 78 is in this position, the rotation of the screw 52 will thread the ball bearing nut 58 from the forward end of the screw 52 to the rearward end of this screw. The balls 76 will roll in the grooves of the screw 52 as well as in the ball race provided by the front and rear ball guides 72 and 74 on the sides. The periphery of the helical portion of the ball race is formed by the ball cam 78.

In the normal operation of the gun bushing 32, upon the release of the sear 22, moves forward under the impetus of the spring 34, to the dot and dash line position indicated by the reference character 32'. The normal firing of the gun provides a recoil which sends the bolt 20, as well as the bushing 32, to its rearmost position. The operation of the gun is controlled by a trigger switch 143 which connects the battery or power supply 145 with the trigger solenoid 147 which is connected to and operates the sear 22 to release it from latching engagement with the bolt 20. The sear 22, when the trigger solenoid 147 is deenergized, operates to latch the bolt in its rearward position. As soon as the trigger solenoid 147 is energized the sear 22 releases the bolt which moves forward under the impetus of the spring 34 to cause firing of the gun. The gun will normally continue firing until the trigger solenoid 147 is deenergized to again latch the bolt 20 in its rearward position.

However, if a cartridge should fail to fire there will be no recoil and the bolt 20 and the bushing 32 will remain in the forward position illustrated by the dot and dash lines indicated by 32'. The time delay switch 127 has a pin 149 normally engaged by the projection 28 to contract the bellows 129 to hold the switch bar 131 in the open position whenever the bolt 20 is in its rearward position. A check valve 151 permits air to escape from within the bellows 129 but closes to delay the expansion of the bellows. The check valve 151, when closed, will allow a slight leakage of air into the interior of the bellows 129 so that in the normal operation of the gun, the expansion of the bellows will be so slow that the switch bar 131 will always be kept in the open position. However, if the gun stops firing in the forward position the bellows 129 will slowly move the switch bar to closed position. The time which it takes the bellows 129 to move the bar 131 to closed position is longer than the interval between the reciprocations of the bolt 20. When the gun ceases firing in the forward position the interval is long enough for the bellows 129, under the impetus of its internal spring, to move the switch bar 131 to the closed position thereby closing the circuit, which includes the electric motor 46, the conductor 133, the time delay switch 127, the conductor 135, the switch 137, the battery or power supply 139, and the conductor 141. The switch 137 is closed during the normal operation of the gun and opened when the operation of the gun is stopped. This energizes the motor 46.

This will cause the screw 52 to be rotated and the ball bearing nut 58 will be threaded rearwardly by the screw 52 carrying the bushing 32 and the bolt 20 from its forward to its rearward position. The ball cam 78 at this time is in its rearward position so that the balls in the helical portion of the race are held in the thread grooves of the screw 52. By this action, the nut 58 is carried from the forward end of the screw 52 to the rearward end with a minimum of friction. The nut 58 is prevented from rotating with the screw by the contact of the key projections 64 and 66 with the upper edges of the slots 60 and 62 in the sleeve 56. These slots 60 and 62 are wider than the key projections 64 and 66 so that the out-turned ends of projections 80 and 82 of the ball cam 78 can likewise travel through them.

The projections 80 and 82 extend beyond the key projections 64, 66, 68 and 70 as is shown in Fig. 2. The rearward ends of the slots 60 and 62 are provided with a portion of reduced width presenting shoulders 153 and 155 adapted to engage the portion of the projections 80 and 82 which extend beyond the projections 68 and 70. These shoulders 153 and 155 are so located that disengagement takes place substantially at the position in which the sear latches the bolt 20 in its rearward position. The screw 52 continues to operate until the engagement of the projections 80 and 82, with the shoulders 153 and 155, has pulled the ball cam 78 out of the nut 58 sufficiently far that the ball cam 78 no longer serves as the periphery of the helical portion of the ball race. This permits the balls to move out against the inner wall of the ball housing 58, thus permitting the balls 76 to leave the thread grooves of the screw 52.

When the bolt 20 is carried to its rearward position the time delay switch 127 will be opened thus deenergizing the motor 46 and stopping the rotation of the screw 52. The shoulders 153 and 155 must be so positioned that the ball cam 78 is disengaged from the ball 76 before the motor 46 is deenergized or at least before the rotation of the screw is completely stopped. If there is considerable inertia in this screw and motor assembly, the motor 46 may be deenergized before the cam 78 is disengaged and the inertia may be relied upon to keep the screw 52 in rotation until the cam 78 is disengaged. In this rearward movement of the nut 58, the spring 34 is compressed thus cocking the gun so that it is prepared to resume firing immediately.

If the trigger switch 143 is kept closed, the sear 22 will not hold the bolt 20 and the bolt as well as the bushing 32 and the ball bearing nut 58 will be rapidly carried to the forward position. To cushion the return of the ball bearing nut 58, there is provided a spring guide ferrule 157 which surrounds the extension of the screw 52. This ferrule 157 is slidably mounted on the shaft portion of the screw 52 within a recess in an extension of the bearing 54. The end of the sleeve 56 also extends into this recess and between it, and the ferrule 157 is a compression spring 159 which with the ferrule 157 acts as a buffer to absorb the inertia of the ball bearing nut 58. The forward end of the screw 52 has no threads and in order to support the nut 58 the shaft portion is provided with an enlarged cylindrical portion 161 which guides the portion of the nut 58 beyond the threads upon the screw 52.

The inertia of the ball bearing nut 58 forces the spring guide ferrule 157 back into the recess and in this action the projections 80 and 82 of the ball cam 78 engage the edges of the recess in the bearing 54 to cause the ball cam 78 to be returned to the position shown in Fig. 1—B wherein the balls in the helical portion of the ball race are again forced into engagement with the screw 52. The portion of the screw 52 with which they are forced into engagement has no threads but the balls are pushed to the beginning of the threaded portion by the spring 159 which, after the impact, moves the nut 58 rearwardly until the balls 76 engage the beginning of the threaded portion of the screw 52. The ball bearing nut 58 will remain in this position throughout all normal firing periods and idle periods of the gun. It will not again be used until the time delay switch 127 should again be closed.

While I have described my releasing ball bearing nut and screw as applied to the charging or cocking of a machine gun it should be obvious that there are many other possible applications wherein it is desired to use a ball bearing nut and to release it at one point of the screw and again reengage it at another point in its traverse of the screw. The ball cam 78 may be provided with a spring latch 163 formed of a spring steel disk having a projection formed therein which is mounted in a recess in the forward ball guide and is adapted to project into two spaced apertures 165 in the projection 82 of the ball cam 78. This prevents the ball cam 78 from moving out of the position to which it is forced. Thus the jarring effect of the firing of the gun will not be able to disturb the position of the ball cam 78.

While the form of embodiment of the invention as herein disclosed constitutes a preferred form, it is to be understood that other forms might be adopted, as may come within the scope of the claims which follow.

What is claimed is as follows:

1. In combination, a sleeve provided with a slot, a screw within the sleeve, a ball bearing nut upon the screw having a projection extending within and guided by the slot, said nut having means forming an endless ball race, one of the confining surfaces of the race having a removable portion, a plurality of balls in said race in engagement with a thread groove in the screw, an operating means extending from said removable portion into said slot, said sleeve having a transverse wall portion forming a part of said slot for engaging and operating said removable portion relative to the remainder of the nut to permit the balls to move out of engagement with said thread groove.

2. In combination, a screw, a ball bearing nut upon the screw including means forming an endless ball race having its major portion in the shape of a helix, a plurality of balls substantially filling said ball race, said nut being provided with sufficient clearance space adjacent said race to permit the balls to disengage themselves from the thread groove of the screw, the confining surfaces of the race including a removable portion having a first position for normally holding the balls in engagement with a thread groove of the screw and a second position in which it is removed from the ball race to permit the balls to disengage themselves from the screw, said removable portion when in the first position being located in said clearance space for blocking off said clearance space from the race to confine the balls in a thread groove of the screw and when in its second position vacating the clearance space adjacent to the ball race and merging the space and the race to permit the balls to protrude into said clearance space and disengage themselves from the screw.

3. In combination, a screw, a ball bearing nut upon the screw including means forming an endless ball race having its major portion in the shape of a helix, a plurality of balls substantially filling said ball race, said nut being provided with sufficient clearance space adjacent said race to permit the balls to disengage themselves from the thread groove of the screw, the confining surfaces of the race including a removable portion having a first position for normally holding the balls in engagement with a thread groove of the screw and a second position in which it is removed from the ball race to permit the balls to disengage themselves from the screw, said removable portion when in the first position being located in said clearance space for blocking off said clearance space from the race to confine the balls in a thread groove of the screw and when in its second position vacating the clearance space adjacent to the ball race and merging the space and the race to permit the balls to protrude into said clearance space and disengage themselves from the screw, means for rotating the screw relative to the nut to cause relative axial movement and means effective when the nut reaches a predetermined axial position relative to the screw for removing said removable portion from the first position forming a portion of the confining surfaces of the ball race to its second position to release the balls from engagement with said screw.

4. In combination, a screw, a ball bearing nut upon the screw including means forming an endless ball race having its major portion in the shape of a helix, a plurality of balls substantially filling said ball race, said nut being provided with sufficient clearance space adjacent said race to permit the balls to disengage themselves from a thread groove of the screw, the confining surfaces of the race including a removable portion having a first position for normally holding the balls in engagement with a thread groove of the screw and a second position in which it is removed from the ball race to permit the balls to disengage themselves from the screw, said removable portion when in the first position being located in said clearance space for blocking off said clearance space from the race to confine the balls in a thread groove of the screw and when in its second position vacating the clearance space adjacent to the ball race and merging the space and the race to permit the balls to protrude into said clearance space and disengage themselves from the screw, means for rotating the screw relative to the nut to cause relative axial movement, means effective when the nut reaches a predetermined axial position relative to the screw for removing said removable portion from the first position forming a portion of the confining surfaces of the ball race to its second position to release the balls from engagement with said screw, spring means for propelling the nut upon release, and means for restoring said removable portion to the first position where it forms a portion of the confining surfaces of the ball race for re-engaging the balls with the thread groove.

5. In combination, a screw, a ball bearing nut upon the screw including means forming an endless ball race having its major portion in the shape of a helix, a plurality of balls substantially filling said ball race, said nut being provided with sufficient clearance space adjacent said removable portion to permit the balls to disengage themselves from a thread groove of the screw, the confining surfaces of the race including a removable portion having a first position for normally holding the balls in engagement with a thread groove of the screw and a second position in which it is removed from the ball race to permit the balls to disengage themselves from the screw, said removable portion when in the first position being located between said clearance space and the ball race for blocking off said clearance space from the race to confine the balls in a thread groove of the screw and when in its second position opening the clearance space to the ball race and merging the space and the race to permit the balls to protrude into said clearance space and disengage themselves from the screw, means for rotating the screw relative to the nut to cause relative axial movement, means effective when the nut reaches a predetermined axial position relative to the screw for removing said removable portion from the first position forming a portion of the confining surfaces of the ball race to its second position to release the balls from engagement with said screw, spring means for propelling the nut upon release, and means effective when the nut reaches a second predetermined position for restoring said removable portion into the first position in which it forms a portion of the confining surfaces of the ball race for re-engaging the balls with the thread groove.

6. In combination, a screw, a ball bearing nut upon the screw including means forming an endless ball race having its major portion in the shape of a helix, a plurality of balls substantially filling said ball race, said nut being provided with sufficient clearance space adjacent said race to permit the balls to disengage themselves from the thread groove of the screw, the confining surfaces of the race including a removable portion having a first position for normally holding the balls in engagement with a thread groove of the screw, and a second position in which it is removed from the ball race to permit the balls to disengage themselves from the screw, said removable portion when in the first position being located in said clearance space for blocking off said clearance space from the race to confine the balls in a thread groove of the screw and when in its second position vacating the clearance space adjacent to the ball race and merging the space and the race to permit the balls to protrude into said clearance space and disengage themselves from the screw, said removable portion having operating means projecting from the nut, means for rotating the screw relative to the nut to cause relative axial movement and separate projecting means projecting into the path of movement of said operating means for moving said removable portion from one of its positions to another.

7. In combination, a screw, a ball bearing nut upon the screw including means forming an endless ball race having its major portion in the shape of a helix, said nut having a clearance space surrounding the ball race, a plurality of balls substantially filling said ball race, the confining surfaces of the race including an axially movable sleeve portion having a first position in which it is located in said clearance space for normally holding the balls in engagement with a thread groove of the screw and a second position in which it is removed from the periphery of the ball race and said clearance space to permit the balls to protrude into said clearance space and disengage themselves from the thread groove of the screw.

8. In combination, a screw, a ball bearing nut upon the screw including means forming an endless ball race having its major portion in the shape of a helix, said nut having a clearance space surrounding the ball race, a plurality of balls substantially filling said ball race, the confining surfaces of the race including an axially movable sleeve portion having a first position in which it is located in said clearance space for normally holding the balls in engagement with a thread groove of the screw and a second position in which it is removed from the periphery of the ball race and said clearance space to permit the balls to protrude into said clearance space and disengage themselves from the thread groove of the screw, said sleeve portion being provided with a camming edge for camming the balls out of the clearance space into engagement with a thread in the screw.

9. In combination, a screw, a ball bearing nut upon the screw including means forming an endless ball race having its major portion in the shape of a helix, said nut having a clearance space surrounding the ball race, a plurality of balls substantially filling said ball race, the confining surfaces of the race including an axially movable sleeve portion having a first position in which it is located in said clearance space for normally holding the balls in engagement with a thread groove of the screw and a second position in which it is removed from the periphery of the ball race and said clearance space to permit the balls to protrude into said clearance space and disengage themselves from the thread groove of the screw, said sleeve portion being provided with an edge having a contour similar to the contour of the ball race, said edge of said sleeve portion being provided with a camming surface for camming the balls out of the clearance space into engagement with a thread groove in the screw.

10. In combination, a screw, a ball bearing nut upon the screw including means forming an endless ball race having its major portion in the shape of a helix, said nut having a clearance space surrounding the ball race, a plurality of balls substantially filling said ball race, the confining surfaces of the race including an axially movable sleeve portion having a first position in which it is located in the clearance space for normally holding the balls in engagement with a thread groove of the screw and a second position in which it is removed from the periphery of the ball race and said clearance space to permit the balls to protrude into said clearance space and disengage themselves from the thread groove of the screw, said sleeve portion being provided with a recessed portion extending between the two ends of the helical portion of the ball race when it is located in its first position for permitting the return of the balls from one end of the helical portion to the other end of the helical portion of the ball race.

11. In combination, a screw, a ball bearing nut upon the screw including an outer housing having a cavity extending through it, a set of sleeve portions within said housing portions, said sleeve portions being of substantially the same diameter and being located in alignment, the adjacent ends of the sleeve portions being spaced from each other a uniform distance throughout, the major portion of each of the ends being in the shape of a helix corresponding to that of the screw to form a ball race, a plurality of balls substantially filling the race formed between the ends of the set of sleeve portions, said housing portion having a clearance space surrounding the adjacent ends of the sleeve portions to permit the balls to protrude therein and disengage themselves from the screw, said nut being provided with an axial movable sleeve portion slidably mounted upon said set of sleeve portions having a first position located in said clearance space surrounding the adjacent ends of the set of sleeve portions to confine the balls in a thread groove of the screw, said axially movable sleeve portion having a second position in which it is axially removed from the clearance space surrounding the ball race to permit the balls to protrude into said clearance space and disengage themselves from the screw.

12. In combination, a screw, a ball bearing nut upon the screw including an outer housing having a cavity extending through it, a set of sleeve portions within said housing portions, said sleeve portions being substantially the same diameter and being located in alignment, the adjacent ends of the sleeve portions being spaced from each other a uniform distance throughout, the major portion of each of the ends being in the shape of a helix corresponding to that of the screw to form a ball race, a plurality of balls substantially filling the race formed between the ends of the set of sleeve portions, said housing portion having a clearance space surrounding the adjacent ends of the sleeve portions to permit the balls to protrude therein and disengage themselves from the screw, said nut being provided with an axially movable sleeve portion having a first position located in said clearance space surrounding the ball race to confine the balls in a thread groove of the screw, said axially movable sleeve portion having a second position in which it is axially removed from the clearance space surrounding the ball race to permit the balls to protrude into said clearance space and disengage themselves from the screw, said axially movable sleeve portion being axially movable relative to said outer housing and having an operating portion protruding from the nut so that it can be axially moved relative to the nut to control the confining of the balls in a thread groove of the screw.

13. In combination, a screw, a ball bearing nut upon the screw including an outer housing having a cavity extending through it, a set of sleeve portions within said housing portions, said sleeve portions being of substantially the same diameter and being located in alignment, the adjacent ends of the sleeve portions being spaced from each other a uniform distance throughout, the major portion of each of the ends being in the shape of a helix corresponding to that of the screw to form a ball race, a plurality of balls substantially filling the race formed between the ends of the set of sleeve portions, said housing portion having a clearance space surrounding the adjacent ends of the sleeve portions to permit the balls to protrude therein and disengage themselves from the screw, said nut being provided with an axially movable sleeve portion normally located in said clearance space surrounding the ball race to confine the balls in a thread groove of the screw, said axially movable sleeve portion having a second position in which it is axially removed from the clearance space surrounding the ball race to permit the balls to protrude into said clearance space and disengage themselves from the screw, said axially movable sleeve portion being axially movable relative to said outer housing and being provided with a camming edge for camming the balls out of the clearance space into engagement with a thread in the screw.

14. In combination, a screw, a ball bearing nut upon the screw including an outer housing having an axially extending cavity, a set of sleeve portions within said housing portion, said sleeve portions being of substantially the same diameter and being located in alignment, the adjacent ends of the sleeve portions being spaced from each other a uniform distance throughout, the major portion of each of the ends being in the shape of a helix corresponding to that of the screw to form a ball race, a plurality of balls substantially filling the race formed between the ends of the set of sleeve portions, said housing portion having a clearance space surrounding the adjacent ends of the sleeve portions to permit the balls to protrude therein and disengage themselves from the screw, said nut being provided with an axially movable sleeve portion normally located in said clearance space to confine the balls in a thread groove of the screw, said axially movable sleeve portion having a second position in which it is axially removed from the clearance space to permit the balls to protrude into said clearance space and disengage themselves from the screw, said axially movable sleeve portion being axially movable relative to said outer housing and being provided with a camming edge having a helical contour similar to the helical contour of the ball race and a deep recessed portion between the ends of the helical contour portion permitting the return of balls from one end of the helical portion of the ball race to the other end thereof.

15. In combination, a screw having its thread interrupted adjacent one end, a releasable nut upon the screw including operating means having one position for releasing the nut from the screw and a second position for re-engaging the threads of the screw, spring means for moving the nut relative to the screw in one direction to the place at which the threads are interrupted, projecting means adjacent the place where the threads are interrupted for engaging and moving said operating means to its second position upon movement of the nut in said one direction to the place where the threads are interrupted for re-engaging the threads of the screw, a second spring means acting in a direction opposite the first mentioned spring means for moving the nut out of the interrupted screw threaded portion to the beginning of the screw threaded portion of the screw, means for rotating the screw relative to the nut to cause relative axial movement in the opposite direction to said one direction, and a second projecting means located a predetermined distance from the interrupted portion of the screw for engaging the operating means to move the operating means to its first mentioned position when the nut travels relative to the screw a predetermined distance in said opposite direction for releasing the nut from the screw.

16. In combination, a screw, a ball bearing nut upon the screw including means forming an endless ball race having its major portion in the shape of a helix, a plurality of balls substantially filling said ball race, the confining surfaces of the race including a removable peripheral portion having a first position for normally holding the balls in engagement with a thread groove of the screw and a second position in which it is removed from the ball race to permit the balls to disengage themselves from the screw, said nut being provided with sufficient clearance space adjacent said peripheral portion to permit the balls to disengage themselves from a thread groove of the screw, said removable peripheral portion when in the position forming the periphery of the confining surfaces of the ball race being located in said clearance space for blocking off said clearance space to confine the balls in a thread groove of the screw and in another position opening the clearance space to the ball race and merging the space and the race to permit the balls to disengage themselves from the screw.

HARRY F. CLARK.

REFERENCES CITED

The following references are of record in the file of this patent:

UNITED STATES PATENTS

| Number | Name | Date |
| --- | --- | --- |
| 645,608 | Schake | Mar. 20, 1900 |
| 676,044 | Locke | June 11, 1901 |
| 2,138,784 | Cooley | Nov. 29, 1938 |
| 2,141,178 | Dyer | Dec. 27, 1938 |
| 2,322,387 | Pitney | June 22, 1943 |

FOREIGN PATENTS

| Number | Country | Date |
| --- | --- | --- |
| 139,400 | Switzerland | Apr. 15, 1930 |